H. E. T. HAULTAIN.
PROCESS OF CONCENTRATING AND SEPARATING MINERALS BY FLOTATION.
APPLICATION FILED JUNE 15, 1915.
1,226,330.
Patented May 15, 1917.
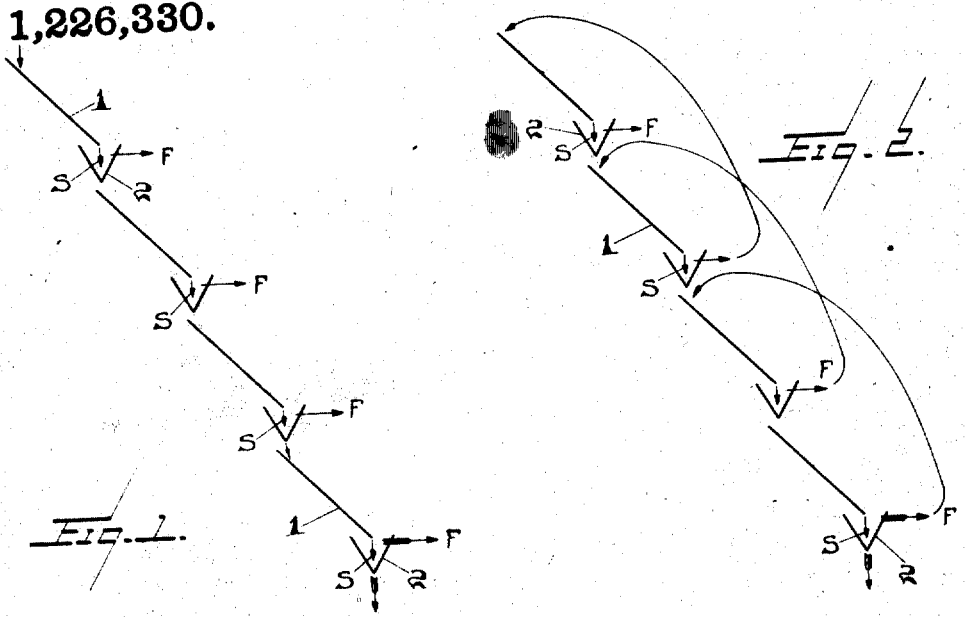
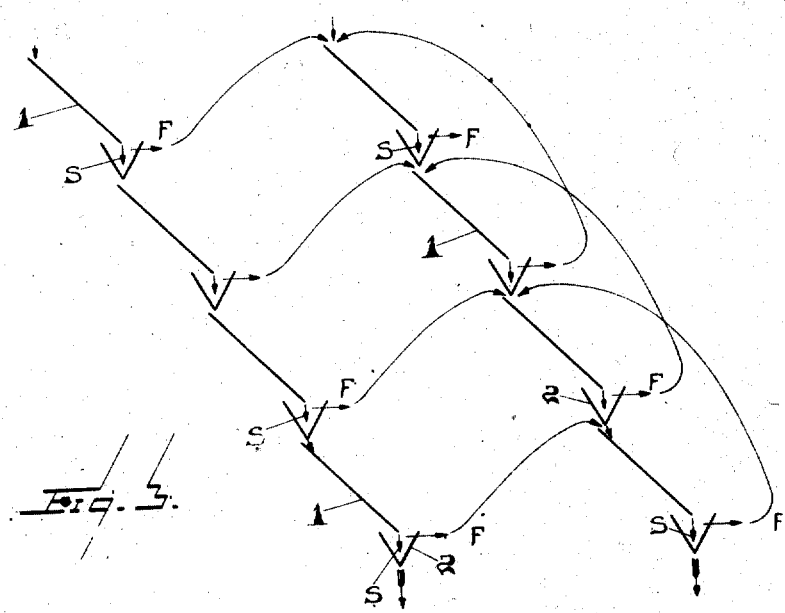
WITNESSES.
N. R. Tyndall
E. P. Hall
INVENTOR.
H. E. T. Haultain
By J. Edward Maybee
ATTY.

UNITED STATES PATENT OFFICE.

HERBERT E. T. HAULTAIN, OF TORONTO, ONTARIO, CANADA.

PROCESS OF CONCENTRATING AND SEPARATING MINERALS BY FLOTATION.

1,226,330.  Specification of Letters Patent.  Patented May 15, 1917.

Application filed June 15, 1915. Serial No. 34,213.

*To all whom it may concern:*

Be it known that I, HERBERT E. T. HAULTAIN, a subject of the King of Great Britain, of 174 College street, in the city of Toronto, county of York, Province of Ontario, Canada, have invented a certain new and Improved Process of Concentrating and Separating Minerals by Flotation, (Case 2,) of which the following is a specification.

This invention relates particularly to a process for selectively separating minerals by flotation in order to secure two or more substantially clean products. It is found that differences exist in the floatability (or wetability) of different minerals, but as these differences are generally very slight, it is almost impossible to so control the conditions that one will float and the other sink. It is found, generally speaking, that a portion of both minerals will float and another portion sink, but that in a flotation process the percentage of the more floatable mineral is higher in the floating product than in the feed. This result seems to be due to competition among the particles rather than to a selective action of the conditions, and the object of my present invention is to take advantage of this competitive flotation in such a way as to secure both a clean sinking product and a clean floating product.

I attain my object by means of the process hereinafter described and illustrated in the accompanying drawings, which are diagrammatical in form, and in which—

Figure 1 is a diagrammatical representation of the first stage of my process and the apparatus for carrying it out;

Fig. 2 a similar view showing the second stage of my process and the apparatus for carrying it out; and Fig. 3 a representation of a slight modification of the apparatus and process.

In the drawings like characters of reference indicate corresponding parts in the different figures.

While my process is adapted to the selective flotation of a variety of minerals, for purposes of illustration I will describe it as used in the selective flotation of copper pyrites and zinc blend, the pyrites being more floatable than the blend.

In carrying out my process I employ any suitable flotation apparatus. Such apparatus is indicated diagrammatically in the drawings, 1 being inclined plates and 2 receptacles in which flotation takes place and from which the sinking product is discharged for re-treatment.

The first stage in my process is carried out with apparatus arranged as in Fig. 1, the treatment being in a series of steps, the sinking product of each step in the series being re-treated in the second step. In this figure the sinking products are indicated by $s$ and the floating products by $f$. The re-treatment is carried out a sufficient number of times to give as a final sinking product a substantially clean zinc blend. The floating products successively become poorer in pyrites and richer in blend.

The floating products are then re-treated in the following manner. They are collected and mixed, and then re-treated with the apparatus arranged as in Fig. 2. In this stage the floating products are progressively moved up in the series for re-treatment for collection at the beginning of the series, and the less floatable products are progressively moved down and removed as a final sinking product at the end of the series. The arrows indicate how the floating product at each step is carried back to mix with the feed to the inclined plate or plates of the earlier step. A counter current mode of operation is thus established, which results in a substantially pure copper product being removed as a float at the beginning of the series, a mixed sinking product being obtained at the end of the series which will probably not pay for further treatment.

As the floating products from the various steps in the first stage are of different quality, it may be preferable, instead of mixing these floating products, to introduce them at those steps in the second stage whose feed they most resemble. Such an arrangement is shown in Fig. 3, the floating product of the first step in the first stage being fed to the inclined plates of the apparatus used in the first step of the second stage. The floating product of the second step is led to mix with the feed to the inclined plates of the apparatus used in the second step, and so on. The specific arrangement shown is not arbitrary and may be varied in many ways, the important point being to feed the floating products of the first stage to the apparatus of the second stage to facilitate as much as possible the movement of the more floatable constituent of the ore to the top of the second stage of the treatment.

As this process depends for its effectiveness on competition among the floating particles, it is important, particularly in the latter stage of the operation, to use a multi-series of steps, three or more re-treatments being probably necessary, though the number of steps may vary according to the ores being treated.

In carrying out this process, the ore is crushed and sufficient water added to form a suitable pulp. Suitable frothing or modifying agents may be employed before the first treatment. With some ores I obtain better results by adding modifying agents between the various steps of the process, particularly between the steps of the first stage. For instance, the sinking products may be agitated with small quantities of oil, but not to the point of frothing, or small quantities of soluble oils, such as Eucalyptus, may be added. Different re-agents may be employed at different steps to increase the selective action and obtain an increased float of the more floatable material.

What I claim as my invention is:

1. A process of concentrating and separating minerals by flotation which consists in pulping the ore; treating the same in a first stage by flotation in a series of steps in which the sinking products are successively re-treated to obtain a final sinking product substantially free of the most readily floatable constituent of the ore, re-treating the floating products of the first stage in a second stage by flotation in a series of steps in which the floating products of each step except the first are returned for re-treatment in a previous step to obtain a substantially clean final product of another constituent of the ore as a float from the first step.

2. A process of concentrating and separating minerals by flotation which consists in pulping the ore; treating the same in a first stage by flotation in a series of steps in which the sinking products are successively re-treated to obtain a final sinking product substantially free of the most readily floatable constituent of the ore, re-treating the floating products of the first stage in a second stage by flotation in a series of steps in which the floating products of each step except the first are returned for re-treatment in a previous step to obtain a substantially clean final product of another constituent of the ore as a float from the first step, the floating products of the first stage being introduced at different steps in the second stage according to the quality of the float.

3. A process of concentrating and separating minerals by flotation which consists in pulping the ore and treating the same by flotation in a multi-series of steps in which the floating products of each step except the first are returned for re-treatment in a previous step to obtain a final product substantially free of the most readily floatable constituent of the ore as a float from the first step.

4. A process of concentrating and separating minerals by flotation which consists in pulping the ore and treating the same by flotation in a multi-series of steps and in which the floating products of the later steps are progressively moved up for re-treatment in earlier steps to obtain the cleanest final floating products at the earlier steps.

5. A process of concentrating and separating minerals by flotation which consists in pulping the ore; treating the same in a first stage by flotation in a series of steps in which the sinking products are successively re-treated to obtain a final sinking product substantially free of the most readily floatable constituent of the ore, re-treating the floating products of the first stage in a second stage by flotation in a multi-series of steps and in which the floating products of each step except the first are returned for re-treatment in a previous step to obtain a substantially clean final product of another constituent of the ore as a float from the first step.

6. A process of concentrating and separating minerals by flotation which consists in dry crushing the ore, pulping the same with water and treating the pulp by flotation in a multi-series of steps and in which the floating products of the later steps are progressively moved up for re-treatment in earlier steps to obtain the cleanest final floating products at the earlier steps.

7. A process of concentrating and separating minerals by flotation which consists in pulping the ore and treating the same by flotation in a multi-series of steps in which the floating products of each step except the first are returned for re-treatment in a previous step to obtain a substantially clean final product of the most readily floatable constituent of the ore as a float from the first step, each step consisting in flowing the pulp down an inclined surface in a thin layer to the surface of a body of water, from the surface of which the floating products are removed and from the bottom of which the sinking products are removed.

8. A process of concentrating and separating minerals by flotation which consists in pulping the ore and treating the same by flotation in a multi-series of steps and in which the floating products of the later steps are progressively moved up for re-treatment in earlier steps to obtain the cleanest final floating products at the earlier steps, each step consisting in flowing the pulp down an inclined surface in a thin layer to the surface of a body of water, from the surface of which the floating products are removed and from the bottom of which the sinking products are removed.

9. A process of concentrating and separating minerals by flotation which consists in dry crushing the ore, pulping the same with water and treating the pulp by flotation in a multi-series of steps and in which the floating products of the later steps are progressively moved up for re-treatment in earlier steps to obtain the cleanest final floating products at the earlier steps, each step consisting in flowing the pulp down an inclined surface in a thin layer to the surface of a body of water from the surface of which the floating products are removed and from the bottom of which the sinking products are removed.

10. A process of concentrating and separating minerals by flotation which consists in pulping the ore and treating the same by flotation in a multi-series of steps and in which the floating products of the later steps are progressively moved up for re-treatment in earlier steps to obtain the cleanest final floating products at the earlier steps, in which flotation re-agents are mixed with the pulp between the steps, each step consisting in flowing the pulp down an inclined surface in a thin layer to the surface of a body of water from the surface of which the floating products are removed and from the bottom of which the sinking products are removed.

11. A process of concentrating and separating minerals by flotation which consists in pulping the ore and treating the same by flotation in a multi-series of steps and in which the floating products of the later steps are progressively moved up for re-treatment in earlier steps to obtain the cleanest final floating products at the earlier steps and in which flotation re-agents of different characteristics are mixed with the pulp between different steps of the process, each step consisting in flowing the pulp down an inclined surface in a thin layer to the surface of a body of water, from the surface of which the floating products are removed, and from the bottom of which the sinking products are removed.

12. A process of concentrating and separating minerals by flotation which consists in treating pulped ore by flotation in a series of steps in which the more floatable products are progressively moved up for collection at the beginning of the series and the less floatable products are progressively moved down and removed as a final sinking product at the end of the series.

13. A process of concentrating and separating minerals by flotation which consists in pulping the ore, treating the same in a first stage by flotation in a series of steps in which the sinking products are successively re-treated to obtain a final sinking product substantially free of the most readily floatable constituent of the ore, re-treating the floating products of the first stage in a second stage by flotation in a series of steps in which the floating products of the later steps are successively returned for re-treatment in previous steps to obtain the cleanest final floating product of another constituent of the ore as a float at the upper end of the series.

14. A process of concentrating and separating minerals which consists in pulping the ore and treating the same by flotation in a multi-series of steps in which the floating products of the later steps are successively returned for re-treatment in previous steps to obtain the cleanest final floating product of the most readily floatable constituent of the ore as a float at the upper end of the series.

15. The herein described method of concentrating the valuable minerals of a pulp stream in a flotation concentration apparatus, which method consists in constantly extracting different flows of said concentrates, at a plurality of points, from the pulp stream; and constantly returning said flows of concentrates to said pulp stream at return points nearer the entrance of said pulp stream into said apparatus than were the respective points of extraction of said flows of said concentrates.

16. The herein described method of concentrating the valuable minerals of a pulp stream in a flotation concentration apparatus, which method consists in extracting different flows of said concentrates, at a plurality of points, from the pulp stream; and returning said flows of concentrates to said pulp stream at return points nearer the entrance of said pulp stream into said apparatus than were the respective points of extraction of said flows of said concentrates.

Signed at Toronto, Ont., this 10th day of June A. D. 1915. In the presence of the two undersigned witnesses.

HERBERT E. T. HAULTAIN.

Witnesses:
 E. P. HALL,
 GEO. P. MACKIE.